Figure 5:
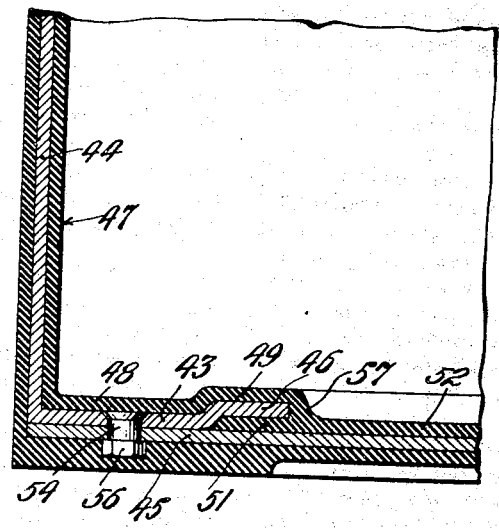

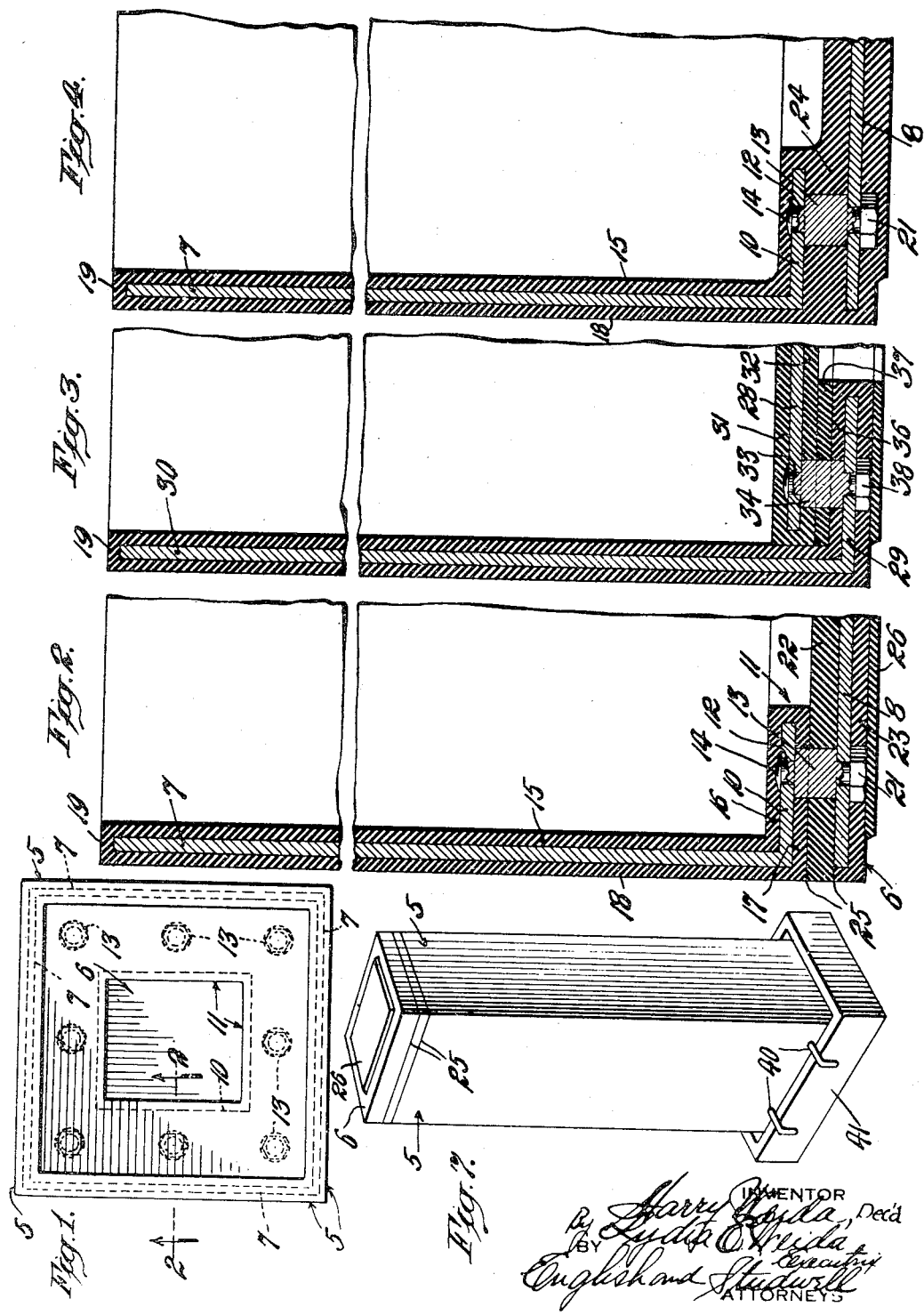

Sept. 16, 1947.  H. WEIDA  2,427,639
BATTERY JAR
Filed Oct. 17, 1938  2 Sheets-Sheet 2

Patented Sept. 16, 1947

2,427,639

UNITED STATES PATENT OFFICE 2,427,639

BATTERY JAR

Harry Weida, deceased, late of Plainfield, N. J., by Lydia E. Weida, executrix, Garden City, N. Y., assignor to American Hard Rubber Company, New York, N. Y., a corporation of New York Application October 17, 1938, Serial No. 235,410

5 Claims. (Cl. 206—2)

The invention relates to an improvement in the production of receptacles for containing acids, such as electrolytes, and other corrosive liquids, and more particularly to an improvement in large deep receptacles especially adapted for use as battery jars or containers for submarines and for other services requiring large secondary batteries.

Such large battery jars are commonly composed of corrosion-resistant plastic compounds, both thermosetting and thermoplastic, such as vulcanizable hard and soft rubber compositions, vulcanizable synthetic rubber compounds, non-vulcanizable vinyl polymerization products, and other suitable corrosion-resistant plastics. These large deep battery jars have heretofore been composed entirely of the plastic compound, such as hard rubber and the like, except occasionally for a metal insert to strengthen the handle portions of the jar. Although the compressive resistance and tensile strength of these plastic compounds are sufficient for the usual conditions of service, there are occasions when large battery jars composed of these compounds are subjected to unusually severe external pressure, with the result that cracks sometimes appear in the walls of the jar, and there is loss of the liquid chemicals, with occasional accompanying other damage.

It has therefore been proposed to provide this type of battery jar with a reinforcing metal insert, embedded in the plastic compound of which the battery jar is composed, whether "hard" or other vulcanized rubber or rubber-like composition, or other corrosion-resisting plastic compound. The cross areas of these large, deep battery jars, however, are sometimes of such restricted dimensions and the jars are so deep relatively to their cross areas that the workmen frequently experience inconvenience and difficulty in reaching the inner surfaces of the lower parts of the walls and the bottom of the metal insert to line or coat them properly with the rubber or other plastic compound, whether in sheet or other form.

The object of the present invention is the production of a "deep" reinforced battery jar of such construction that the metal insert constituting the internal reinforcement of the walls and bottom of the jar may be conveniently lined and covered with the plastic compound while the latter is in soft, pliable or easily workable condition, regardless of the relative dimensions of the cross area and depth of the battery jar to be produced. To this end the invention in one embodiment consists in forming the metal reinforcing insert for the battery jar in two or more separate parts, appropriately securing the parts together with a layer or layers of the plastic compound between them, completely covering the metal structure with the plastic compound and then curing or setting the compound to final condition. More specifically the invention in a commercially satisfactory embodiment consists in preparing a box-like metal structure (which is to be embedded in the walls and bottom of the battery jar), consisting of an upper or body part, and a bottom mechanically secured to the lower end of the body. The body part of the metal insert may consist of a plurality of side walls, usually four, having inturned flanges at their lower ends to form the marginal portions of a false bottom to which the bottom proper in the form of a metal plate is secured in metal to metal contact, but with a layer of plastic compound properly interposed between portions of the flanges and the margins of the plate to seal the joint between them to prevent the ingress of liquid from the container or battery jar. Before the bottom plate is attached to the flanges, the top surface of the flanges and adjacent inner surfaces of the lower ends of the walls are lined with the plastic compound, access to these parts being had through the opening in the false bottom. The bottom plate is attached to the flanges of the body part of the metal insert in such manner that a liquid-tight joint is assured and there is a metal to metal contact between the flanges and the plate, either directly or through the fastening means. After the bottom plate is secured in position, any exposed surfaces of the metal insert are covered with the plastic compound. The final step in the production of the improved battery jar is the curing or setting of the plastic compound in which the metal insert is embedded. If the plastic compound is vulcanizable the whole structure is placed in a vulcanizing chamber. If the plastic compound is non-vulcanizable, such as a vinyl polymerisation product, the completed structure is simply permitted to stand until the cement securing the sheets of the compound to the metal insert and to each other has sufficiently set.

Figure 6:
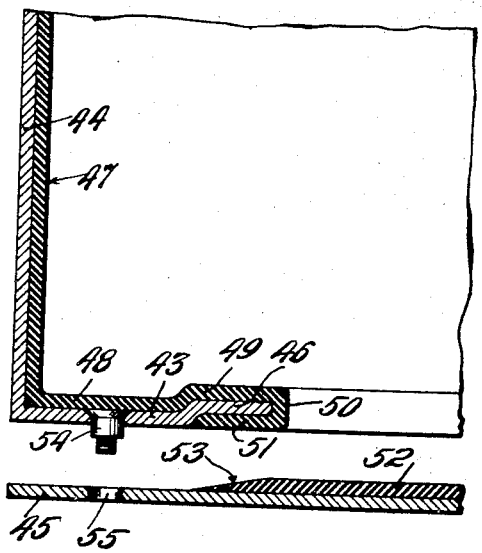

In the accompanying drawings illustrating the improved large, deep battery jar and the method of lining and covering the parts of the metal insert with plastic compound and vulcanizing the assembled structure, Fig. 1 is a top plan view of the complete battery jar; Fig. 2 is a longitudinal section taken on the line 2—2 of Fig. 1 of the battery jar before vulcanization; Fig. 3 is a view similar to Fig. 2, of a modified form of battery jar embodying the invention; Fig. 4 is a view similar to Fig. 2, but showing the structure after vulcanization; Fig. 5 is a longitudinal section of a portion of another modified form of the invention; Fig. 6 is a view similar to Fig. 5, but showing the partially coated metal parts before they are fastened together; and Fig. 7 is a perspective view of the assembled battery jar in inverted position and of the means for supporting it during vulcanization.

When completed, the improved reinforced deep battery jar or other acid container of the present invention has substantially the same appearance as the usual type of non-reinforced jar or container in that it may be polygonal in cross section and preferably composed of four upright walls 5 open at the top and closed at their lower ends by a bottom, generally indicated at 6.

Containers of the type constituting the subject-matter of the present invention are not because of their size and peculiar structure usually molded, and consequently are commonly built or constructed. To produce the improved acid container of the present invention, the reinforcing metal insert is first formed as two sections or parts; an upper box-like body part consisting of upright walls with the marginal portions of a bottom attached to their lower ends, and a plate-like part or bottom proper of substantially the same cross sectional area as that of the box-like body part. The body or box-like part consists of four upright walls 7 and the plate-like part or bottom proper consists of a flat plate 8 which may or may not be reinforced with a smaller plate or plates. The walls 7 of the metal reinforcing box-like body may be formed from a single sheet of metal bent into the requisite cross-sectional shape and area and welded together at their lateral edges, or they may be separate plates welded together at their joints. The lower ends of the metal plates 7 are turned inwardly as flanges 10, which constitute the marginal portions of a false bottom for supporting the bottom 8. The inner edges of the four sides of the square formed by the flanges 10 bound an opening 11 through which the workmen may have access to the lower parts of the inner surfaces of the insert walls 7 and the top surface of the flanges 10 to coat or line them with the plastic compound.

Although it will be understood that the plastic compound covering the metal insert of the improved reinforced large and deep acid container of the present invention may be composed of any suitable corrosion-resisting substance or material, and that the compound may be applied to the surfaces of the metal insert in any preferred manner, as in sheet form or by spraying, for the purposes of description and illustration, it will be assumed that the corrosion-resistant compound is applied to the metal surfaces in the form of sheets, properly cemented to the metal and to each other and which may be converted into final condition "by setting" or by vulcanization. In this connection, it will be understood that the corrosion-resistant compound may be either a thermoplastic, as a vinyl polymerization product, or thermosetting, as a rubber composition or synthetic rubber composition. Accordingly, the term "plastic compound" as herein used, is intended to be a term of description, and not of limitation, of any suitable pliable material in sheet form, which may thereafter be vulcanized or self-set to final condition.

Before the sheets of plastic compound are applied to the inner surfaces of the metal insert walls 7 and the upper surface of the flanges 10, the flanges are pierced at intervals with holes to receive the upper ends of rivets or studs 12 for supporting the bottom plate 8. In some cases bolts or other fastening means may be used. It is assumed in the present case that the members 12 are rivets or studs, projecting downwardly through the flanges 10, their heads 14 being peened or welded to the inner or upper surface of the flanges 10. Each stud is provided with an enlargement or spacing head 13 the upper end of which takes up against the under surface of the flanges 10. The stud enlargements 13 serve to space the bottom 8 from the flanges 10, and in this form of the invention to constitute a metal to metal contact between the bottom 8 and the flanges.

The layer of plastic compound coating or lining the inner surface of the metal insert walls 7 is indicated at 15, and the layer of plastic compound coating or lining the upper surface of the flanges 10 is indicated at 16. The layer 16 is brought downwardly over the inner edges of the flanges 10 and is then continued outwardly at 17 as a coating or covering for the under surface of the flanges 10. Before applying the layer of plastic compound 17 to the under surface of the flanges 10 it is convenient to cut out holes in the layer to accommodate the spacing heads 13. When the bottom surface of the flanges 10 has been coated with the layer of plastic compound 17, the outer surfaces of the insert walls 7 and the top ends thereof may be coated with a layer of plastic compound, as indicated at 18 and 19, but in general practice it has been found desirable to delay the application of these coatings or layers to the metal insert body until after the bottom 8 has been applied thereto.

In the form of container shown in Fig. 2, the bottom plate 8 (which is preferably as long and wide as the cross sectional dimensions of the metal insert body) is supported in spaced relation with the under surface of the flanges 10 by the lower ends of the studs 12, being held against the lower ends of the spacing heads 13 by the nuts 21 threaded onto the lower extremities of the studs 12. Before securing the bottom plate 8 to the insert body 7, its upper surface is covered with a layer of plastic compound 22, pierced with holes to fit over the stud heads 13. The length of the stud heads is such relatively to the thickness of the layers of plastic compound, that when the bottom plate 8 is secured in place on the studs 12 the contacting layers 17 and 22 are squeezed together so that when vulcanized or set they will coalesce and form a homogeneous body, as shown at 24 in Fig. 4, in which it will be observed that the lines 25 of Fig. 2, indicating the planes of contact between the plastic compound layers, have disappeared. In some cases it is considered desirable to apply the layer of plastic compound 23 to the under surface of the bottom plate 8 before the latter is secured in position at the lower end of the container structure. But in the usual practice of the invention the covering of the outer or under surface of the bottom plate 8 and the outer surface of the walls 7 is left until the bottom plate is secured to the flanges 10. When this has been done, as described, all the exposed metal surfaces of the container structure, including the nuts 21, are appropriately covered with the plastic compound, thereby putting the container in condition for setting or vulcanization. The layer 26 of plastic compound covering the nuts 21, it will be observed, projects slightly beyond the outer or lower surface of the bottom 6 of the container.

In the production of certain sizes of this type of battery jar it has been found unnecessary to secure the bottom plate to the flanges 10 by mechanical fastenings, it being ascertained by experiment that the coalescence or sticking together of the layers of plastic compound covering the bottom surface of the flanges 10 and the upper surface of the margin of the plate 8 through vulcanization or setting produces a joint sufficiently strong to make the bottom plate structure integral or substantially integral with the upper box-like body part of the battery jar, as in the case where the jar is composed entirely of the plastic compound.

In the modified form of the invention shown in Fig. 3, the bottom plate 28 is placed within the body part of the container structure and is supported by the flanges 29 inturned from the metal body walls 30. The upper surface of the bottom plate 28 is coated with a layer of plastic compound 31 and the under surface coated with a layer 32. The margins of the plate 28 are pierced with holes to receive the upper ends of rivets or studs 33 each of which is provided with an enlargement or spacing head 34 which rests upon the upper surface of the flanges 29 and thereby holds the plate 28 spaced apart from the flanges 29 sufficiently to accommodate the layer of plastic compound 36 covering the upper surface of the flanges 29, the layer 32 and the interposed hollow-square layer 37 of plastic compound. A nut 38 which takes up against the under surface of the flange 29 holds each rivet and the compound covered plate 28 in place. In this form of the invention, the plate 28 is of course coated on both its top and under surfaces with the layers of plastic compound before the bottom plate structure is placed on the hollow square layer 37, after the layer 36 has been placed on the flanges 29. In other respects the practice of the invention in producing this form of the improved battery jar or container is carried out as in the form shown in Figs. 2 and 4.

In the form of the invention shown in Figs. 5 and 6, there is a direct metal contact between the under surface of the flange 43 projecting inwardly from the lower end of the wall 44 of the box-like body part of the metal insert and the upper surface of the marginal portion of the bottom plate 45, rather than through the interposition of the enlargements or spacers 13 and 34 of the forms of the invention shown in Figs. 2 and 3. In this modified form of the invention the inner margins 46 of the flanges 43 are offset or raised above the general plane of the flanges 43 substantially the thickness of a layer of the plastic compound. In constructing a large, deep battery jar or acid container embodying this modification of the invention, the inner surface of the walls 44 is coated with a layer 47 of the plastic compound, the upper surface of the flange 43 is covered with a layer 48, and the upper surface of the offset portion 46 of the flange 43 is covered with a layer 49 which is carried downwardly over the inner edge of the offset portion 46 of the flange, as indicated at 50 in Fig. 6, and then is carried outwardly to overlap the under surface of the offset flange portion 46, as indicated at 51. The inner or middle portion of the upper surface of the bottom plate 45 is then coated with a layer 52 of plastic compound the outer edge of which, which registers with the hollow-square layer 51, is bevelled, as indicated at 53. The two parts of the container are next brought together, the rivet 54, being received within the hole 55 in the margin of the bottom plate 45 and the plate being secured in position against the under surface of the flange 43 by means of the nut 56 (Fig. 5). In applying the bottom plate 45 to the flange 43 of the box-like body part of the metal insert so that there is a direct metal to metal contact between the upper surface of the margin of the plate 45 and the bottom surface of the flanges 43, the bevelled portion 53 of the layer 52 of plastic compound is squeezed against the layer 51 of plastic compound so that a liquid tight joint is formed between the under surface of the offset lip 46 of the flange 43 and the corresponding portion of the upper surface of the plate 45, strengthened by the fillet indicated at 57 in Fig. 5, formed by the excess or extruded compound. The exposed portions of the container may now be covered with the layers of plastic compound in the same manner in which this is done in the forms of the invention shown in Figs. 2 and 3.

When the metal reinforcing insert structure has been lined and covered with the plastic compound, the improved battery jar or container is in condition for setting or for vulcanization. The latter process may conveniently be accomplished by supporting the structure as a whole either upside down, as indicated in Fig. 7, or in normal upright position. In either case it is desirable to support the jar or container structure clear from the flooring of the vulcanizing tank. Temporary holes may be drilled into the sides of the jar or container near either end and studs 40 fitted therein, as indicated in Fig. 7, to support the jar on the frame 41 during the vulcanization process. When this has been completed the studs 40 are removed, the holes blocked up with compound and the latter locally vulcanized, a common practice in the art.

In the case of the use of non-vulcanizable compounds, such as vinyl polymerization products, the layers of the plastic compound are applied to the surfaces of the metal insert in the same manner in which the layers of vulcanizable compound are applied, that is, either in sheet form, or by spraying, but in this case the adhesion of the layers of the non-vulcanizable compound to the metal insert and to each other is secured through the setting of the cement used to attach the layers of compound to the metal and to each other.

From the foregoing description it will be understood that the present invention provides a convenient method of making large, relatively deep reinforced acid containers, such as battery jars for submarines, which have heretofore, if made at all, been produced with great difficulty because of the inconvenience in reaching the inner surface of the lower parts of the box-like metal insert for the containers to apply the layers of plastic compound properly to the metal surfaces. It has been proposed heretofore to "set" or vulcanize separately various parts of reinforced large hollow plastic compound structures or receptacles and then secure the previously finished parts together by mechanical fastening means. Such practice is in many cases unsatisfactory because of the inequalities of the surfaces being forced together, and the tendency of the acids which such structures are designed to contain to work along the laminations or joints of the contacting surfaces. Soft rubber gaskets are usually used between such joints, but soft rubber is not as resistant to all acids as hard rubber compounds, it ages and loses its flexibility and so is not under all conditions a satisfactory material for use in acid containers.

In the present invention, on the contrary, there can be no leakage at the joints where the layers of set or vulcanized compound come into contact with each other and with the metal any more than in structures which are composed entirely of homogeneous plastic compound, since during the setting or vulcanization process the contacting plastic compound layers covering the surfaces of the bottom plate and of the flanges connected therewith are caused to coalesce and become a homogeneous mass, as shown in Fig. 4. Although the metal reinforcing insert for the container comprises two separate parts, nevertheless these two parts are held together in metal to metal contact as firmly as though the insert were a single piece, so that the improved deep acid container or battery jar of the present invention has all the advantages as to strength and rigidity of a reinforced plastic compound structure in which the metal insert is an entity entirely lined and covered with the plastic compound. In this connection it will be observed that since the homogeneous plastic compound completely surrounds the studs and the nuts securing the bottom plate in place, the result is that the improved reinforced container is in essence the same in structure as it would be if the bottom plate were integral with the metal box-like body part.

Having thus described the invention, what is claimed as new is:

1. A battery jar comprising a metal box-like member consisting of a plurality of walls joined together at their lateral edges and having an opening at each end, and a metal plate fastened to one end of the walls in metal to metal contact therewith to form a jar closed at one end, a layer of plastic compound interposed in the joint between the walls and the plate to prevent ingress of liquid from the interior of the jar into the joint, and a layer of plastic compound covering the inner and outer surfaces of the metal jar.

2. A battery jar comprising an upper member consisting of a metal box-like structure having a plurality of side walls, and flanges extending inwardly from the lower ends of the walls and defining an open space, a metal plate attached to the under side of the flanges of the upper member in metal to metal contact therewith so as to form with the upper member a metal structure closed at one end and open at the other, a layer of acid resisting plastic compound completely covering the inner and outer surfaces of the metal structure, and a layer of the plastic compound interposed in the joint between the flanges and the plate to prevent ingress of liquid into the joint.

3. An acid-resisting container comprising an upper member consisting of a metal box-like structure having a plurality of side walls, and flanges extending inwardly from the lower ends of the walls and defining an open space, and a layer of plastic compound covering the metal box-like structure, and a bottom member attached to the under side of the flanges of the upper member and consisting of a metal plate and a layer of plastic compound covering the plate, the plastic compound covering the under surface of the flanges and the plastic compound covering the upper surface of the margin of the plate being coalesced together as a homogeneous mass.

4. A reinforced plastic-compound container having side walls and a bottom closing one end of the walls to form a container, comprising a metal structure having walls corresponding to the walls of the container and embedded therein, said metal-wall structure being open at both ends, a metal plate for closing the opening at the bottom end of the metal walls, metallic means for holding the metal walls and metal plate together in fixed relative position, a layer of plastic compound interposed between the walls and the plate to seal the joint therebetween and a layer of plastic compound covering the inner and outer surfaces of the metal plate.

5. A container for holding liquid acids, comprising a metal structure consisting of side walls joined together at their lateral edges, and a metal plate secured by metallic means to one of the walls to form therewith a container closed at one end and open at the other, and a layer of acid resisting plastic compound covering the inner and outer surfaces of the metal container and interposed between portions of the ends of the walls and the plate so as to prevent entrance of the liquid acid into the metal to metal joint between the walls and the plate.

LYDIA E. WEIDA,
*Executrix of the Estate of Harry Weida, Deceased.*

REFERENCES CITED

The following references are of record in the file of this patent:

UNITED STATES PATENTS

| Number | Name | Date |
|---|---|---|
| 1,311,558 | Hayward, Jr. | July 29, 1919 |
| 1,545,328 | Holland | July 7, 1925 |
| 1,670,158 | Klug | May 15, 1928 |
| 2,141,791 | Keller | Dec. 27, 1938 |
| 1,256,750 | Weida | Feb. 19, 1918 |
| 1,464,868 | Finley | Aug. 14, 1923 |
| 1,485,061 | Ahlgren | Feb. 26, 1924 |
| 1,412,962 | Perrault | Apr. 18, 1922 |
| 1,380,520 | Blanchard | June 7, 1921 |
| 1,876,849 | Bronson | Sept. 13, 1932 |
| 1,917,929 | Duffy | July 11, 1933 |
| 2,060,120 | Roy | Nov. 10, 1936 |
| 2,130,905 | Schelhammer | Sept. 20, 1938 |
| 656,700 | Pullen | Aug. 28, 1900 |
| 1,311,558 | Hayward | July 29, 1919 |
| 1,367,231 | Boyer | Feb. 1, 1921 |

FOREIGN PATENTS

| Number | Country | Date |
|---|---|---|
| 229,165 | Great Britain | Feb. 19, 1925 |